United States Patent
Rasmussen et al.

(10) Patent No.: US 7,933,522 B2
(45) Date of Patent: Apr. 26, 2011

(54) OPTICAL SIGNAL TRANSMISSION SYSTEM AND OPTICAL SIGNAL TRANSMISSION METHOD

(75) Inventors: Jens Rasmussen, Kawasaki (JP); Akihiko Isomura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 582 days.

(21) Appl. No.: 11/892,303

(22) Filed: Aug. 21, 2007

(65) Prior Publication Data
US 2008/0107425 A1 May 8, 2008

(30) Foreign Application Priority Data
Nov. 2, 2006 (JP) .................................. 2006-299011

(51) Int. Cl.
*H04J 14/02* (2006.01)
*H04B 10/18* (2006.01)

(52) U.S. Cl. .......................................... 398/147; 398/81
(58) Field of Classification Search ..................... 398/81, 398/147
See application file for complete search history.

(56) References Cited

U.S. PATENT DOCUMENTS

| | | | |
|---|---|---|---|
| 5,930,414 A | 7/1999 | Fishman | |
| 6,690,889 B2 * | 2/2004 | Desthieux et al. ............ | 398/147 |
| 2001/0010693 A1 | 8/2001 | Wedding | |
| 2004/0207900 A1 | 10/2004 | Matsumoto et al. | |
| 2005/0036727 A1 | 2/2005 | Wijngaarden et al. | |
| 2005/0162741 A1 | 7/2005 | Sone et al. | |
| 2006/0013592 A1 | 1/2006 | Isomura | |
| 2009/0190930 A1 * | 7/2009 | Von Der Weid ................ | 398/81 |

FOREIGN PATENT DOCUMENTS

| | | |
|---|---|---|
| JP | 11-196046 A | 7/1999 |
| JP | 2000-033079 | 2/2000 |
| JP | 2001-268010 A | 9/2001 |
| JP | 2004-219701 | 8/2004 |
| JP | 2005-65273 | 3/2005 |
| JP | 2006-025373 A | 1/2006 |
| WO | 2004/083945 | 9/2004 |

OTHER PUBLICATIONS

"Multi-channel PMD Mitigation and Outage Reduction Though FEC With Sub-Burst-Error-Correction Period, PMD Scrambling", Xiang Liu, IEEE member, Chongjin Xie, IEEE member, Adriaan J. van Wijngaaden, IEEE senior member, IEEE Photonics Technology Letters, vol. 9, Sep. 2004, pp. 2183-2185.

"Multi-channel PMD Mitigation through forward error correction with distributed fast PMD scrambling", X.Liu, C. Xie, Adriaan J. van Wijngaaden, WE2 pp. 1-3.

(Continued)

*Primary Examiner* — Leslie Pascal
(74) *Attorney, Agent, or Firm* — Fujitsu Patent Center

(57) ABSTRACT

Influence of polarization mode dispersion, occurring in an optical fiber is mitigated by means of polarization scrambling, differential group delay which a received optical signal has is optically suppressed; the optical signal in which differential group delay is thus suppressed is converted into an electric signal; and error correcting processing is carried out on the electric signal obtained, a jitter amplitude in the received optical signal is suppressed, influence of which to a jitter tolerance increases due to increase in speed of the polarization scrambling.

10 Claims, 11 Drawing Sheets

OTHER PUBLICATIONS

"Improved PMD Tolerance in Systems Using Enhanced Forward error correction through Distributed Fast Polarization Scrambling", X. Liu, C. R. Gites (1), X. Wei (2), A.J. van Wijingaaden (2), Y.H. Kao (3), C. Xie (1), L. Moller (1) ECOC 2005 Proceedings-vol. 3, Paper We1. 3.6, pp. 343-344.

"Direct Measure of System Margin Enhancement By Polarization Scrambling", C. R. Davidson, H. Zhang, Y. Cai, L. Liu, J.-X. Cai, A. Philipatskii, M. Nissov, Neal S. Bergano, WE1, Optical Society of Amer. 2004.

"Experimental evaluation of the effect of polarization scrambling speed on the performance of PMD mitigation using FEC", Zhihong Li, Jinyuu Mo, Yl Dong, Yixin Wang, Chao Lu, MF69, Optical Soc. of Amer. 2004.

"Jitter and wander tolerance of network interfaces", ITU-T Rec. G. 8251 (Nov. 2001), pp. 5 and 8.

"Present situation and problems of automatic polarization mode dispersion compensating technology", Fujitsu Laboratories, Akihiko Isomura, Joji Ishikawa, OPTRONICS (2003), No. 10, pp. 1-4.

Adaptive PMD Compensation by Electrical and Optical Techniques', Journal of Lightwave Technology vol. 22, No. 4, pp. 1116-1117, Apr. 2004.

Japan Patent Office; English-language partial translation of Office Action mailed Oct. 26, 2010, in connection with corresponding JP patent application No. 2006-299011.

* cited by examiner

OPTICAL SIGNAL TRANSMISSION SYSTEM AND OPTICAL SIGNAL TRANSMISSION METHOD

BACKGROUND OF THE INVENTION

1. Field of the Invention

The present invention relates to an optical signal processing apparatus, an optical signal transmission system and an optical signal processing method, and, in particular, to an optical signal processing apparatus and an optical signal processing method applied to an optical signal transmission system in which influence of polarization mode dispersion of an optical fiber is mitigated by means of polarization scrambling, and the optical signal transmission system.

2. Description of the Related Art

Technology of mitigating influence of polarization mode dispersion (PMD) of an optical fiber which is a signal transmission medium for transmitting an optical signal, by polarization scrambling, is known (see the non-patent documents 1-4, mentioned below).

FIG. 1 (a) shows a block diagram illustrating an optical signal transmission system in such case.

In FIG. 1 (a), an optical signal transmitted from a transmission apparatus 10 undergoes polarization scrambling by a polarization scrambler 40, then, is transmitted by an optical fiber 50, and, is received by a reception apparatus 20. In the reception apparatus 20, transmitted information is extracted from the thus-received optical signal, and then, undergoes forward error correction (FEC) processing by a forward error correction processing part 25.

FIG. 1 (b) illustrates functions in this optical signal transmission system.

In FIG. 1 (b), a curve labeled by WITHOUT POLARIZATION SCRAMBLING shows penalty obtained when polarization scrambling by the polarization scrambler 40 is not carried out. A curve labeled by WITH POLARIZATION SCRAMBLING shows penalty obtained when polarization scrambling by the polarization scrambler 40 is carried out. A curve labeled by WITH POLARIZATION SCRAMBLING AND FEC shows a penalty for a case where polarization scrambling by the polarization scrambler 40 is carried out and also forward error correction processing is carried out on the reception side.

As can be seen from FIG. 1 (b), by means of the polarization scrambling, PMD (Polarization Mode Dispersion) tolerance can be improved, and, also, by means of the forward error correction processing on the reception side, the PMD tolerance can be further effectively improved.

The above-mentioned 'penalty' means an index indicating a degree of disadvantage in an optical signal transmission system due to polarization mode dispersion. In order to achieve proper optical signal transmission, this value should be controlled to be lower than a predetermined level. Further, the above-mentioned 'PMD tolerance' shows an allowable maximum value of a polarization mode dispersion amount for controlling the penalty to be lower than the predetermined value.

As known, polarization scrambling causes jitter having a value equal to differential group delay (DGD) in an optical signal transmitted.

FIG. 2 shows this phenomenon. FIG. 2 (a) shows an optical signal transmission system the same as that shown in FIG. 1 (a), and FIG. 2 (b) shows jitter occurring due to polarization scrambling in this system.

FIGS. 6-8 illustrate influence of polarization mode dispersion (PMD).

FIGS. 6-7 illustrate first-order PMD in a single-mode fiber.

FIG. 6 (a) shows a transmission signal, which is transmitted by an optical fiber as shown in FIG. 6 (b). As shown in FIG. 6 (b), in the single-mode fiber, two polarization modes having an angle θ therebetween exist, and signal transmission speeds are different between these polarization modes. Even in this case, as long as a signal is transmitted within a single polarization mode, as shown in FIG. 6 (c), (d), no influence of the polarization mode dispersion occurs.

On the other hand, when a signal is transmitted through the two polarization modes as shown in FIG. 7 (b), since the signal transmission speeds are different between these polarization modes, influence of the polarization mode dispersion occurs as shown in FIG. 7 (c), and thus, as shown in FIG. 7 (d), the signal waveform is distorted.

FIG. 8 shows a model assuming a state in which a plurality of optical fibers 50-1, 50-2, 50-3, . . . , are connected. In this case, when the respective optical fibers are connected where polarization modes thereof have different angles θ, differential group delay and the angle θ through all the optical fibers thus connected depend from a wavelength of a signal to transmit. In such a case, polarization mode dispersion, i.e., high-order polarization mode dispersion, occurs, which has complicated characteristics varying due to ambient temperature and so forth, and thus, it is not easy to estimate influence thereof to effectively compensate the same.

The above-mentioned polarization scrambling enables efficient error collection in forward error correction processing by changing a polarization state at a high speed with respect to a FEC frame period in the forward error correction processing so that all the polarization modes occur within a single FEC frame period (see the patent document 5 mentioned below).

However, when the polarization scrambling is thus carried out faster, jitter caused by the polarization scrambling becomes serious accordingly as known.

FIG. 3 illustrates jitter tolerance. In FIG. 3, an area enclosed by polygonal lines corresponds to the jitter tolerance. This area represents a range in which influence of the jitter is sufficiently small so that transmitted information can be extracted with high precision through clock recovery carried out on a received signal (see patent document 6 mentioned below).

As shown in FIG. 3, when a jitter frequency (horizontal axis) increases, the jitter tolerance decreases accordingly, positive capture of a signal through clock recovery becomes difficult, and thus, it is not possible to extract the transmitted signal from the received optical signal with high precision. That is, since the jitter frequency increases as the polarization scrambling is made faster, influence of the jitter amplitude on the jitter tolerance increases, and thus, it is not possible to extract the transmitted signal from the received optical signal with high precision.

FIG. 4 shows increase/decrease in the above-mentioned penalty with respect to the scrambling frequency in the polarization scrambling. As shown in FIG. 4, when the polarization scrambling is made slower (left hand of FIG. 4), the forward error correction processing cannot be carried out efficiently, and thus, the penalty increases. On the other hand, when the polarization scrambling is made faster, while the forward error correction processing can be carried out efficiently, the jitter tolerance lowers as described above with reference FIG. 3, whereby, extraction of the transmitted information cannot be carried out with high precision. Thus, the penalty also increases (solid curve in FIG. 4).

This is because, as a result of the polarization scrambling being carried out faster, influence of the jitter amplitude on the jitter tolerance increases as shown in FIG. 3, whereby clock recovery of the received signal cannot be carried out properly, and thus, it is difficult to extract the transmitted information with high precision.

Documents disclosing related arts are listed below:
Patent Document 1: WO2004/083945 A1;
Patent Document 2: 2000-33079;
Patent Document 3: 2004-219701;
Patent Document 4: 2005-65273;
Non-patent Document 1: "Multi-channel PMD Mitigation and Outage Reduction Though FEC With Sub-Burst-Error-Correction Period, PMD Scrambling", Xiang Liu, IEEE member, Chongjin Xie, IEEE member, Adriaan J. van Wijngaaden, IEEE senior member, IEEE PHOTONICS TECHNOLOGY LETTERS, VOL. 9, SEPTEMBER 2004, 2183-2185 pages;
Non-patent Document 2: "Multi-channel PMD Mitigation through forward error correction with distributed fast PMD scrambling", X. Liu, C. Xie, Adriaan J. van Wijngaaden, WE2 1-3 pages;
Non-patent Document 3: "Improved PMD Tolerance in Systems Using Enhanced Forward error correction through Distributed Fast Polarization Scrambling", X. Liu, C. R. Gites (1), X. Wei (2), A. J. van Wijngaaden (2), Y. H. Kao (3), C. Xie (1), L. Moller (1) ECOC 2005 Proceedings-Vol. 3, Paper Wel. 3.6, 343-344 pages;
Non-patent Document 4: "Direct Measure of System Margin Enhancement By Polarization Scrambling", C. R. Davidson, H. Zhang, Y. Cai, L. Liu, J.-X. Cai, A. Philipatskii, M. Nissov, Neal S. Bergano, WE1;
Non-patent Document 5: "Experimental evaluation of the effect of polarization scrambling speed on the performance of PMD mitigation using FEC", Zhihong Li, Jinyuu Mo, Y1 Dong, Yixin Wang, Chao Lu, MF69;
Non-patent Document 6: "Jitter and wander tolerance of network interfaces", ITU-T Rec. G. 8251 (11/2001), 5 and 8 pages;
Non-patent Document 7: "Present situation and problems of automatic polarization mode dispersion compensating technology", Fujitsu Laboratories, Akihiko Isomura, Joji Ishikawa, OPTRONICS (2003), No. 10, 1-4 pages

SUMMARY OF THE INVENTION

The present invention has been devised in consideration of the above-mentioned problems, and an object of the present invention is to provide a configuration in which, in an optical signal transmission system in which influence of polarization mode dispersion of an optical fiber is mitigated by means of polarization scrambling, the polarization scrambling is carried out faster so that error correction processing can be carried out efficiently. Also, reduction in jitter tolerance caused by the increase in the speed of the polarization scrambling should be effectively controlled. That is, as indicated by a broken line of FIG. 4, the penalty should be effectively reduced even when the polarization scrambling is thus made faster.

In order to achieve the object, according to the present invention, in an optical signal processing apparatus in an optical signal transmission system in which influence of polarization mode dispersion, occurring in an optical fiber, is mitigated by means of polarization scrambling, a polarization mode dispersion compensating part (corresponding to an optical polarization mode dispersion compensation unit 30 of FIG. 5 (a)) is provided, which is configured to optically suppress differential group delay, occurring in a received optical signal having undergone the polarization scrambling.

As a result, as shown in FIGS. 5 (b) and (c), the polarization mode dispersion compensating part suppresses the differential group delay, thereby, a jitter amplitude is reduced, jitter tolerance is improved, and thus, error correction processing can be carried out efficiently.

Thus, according to the present invention, in an optical signal transmission system in which influence of polarization mode dispersion of an optical fiber is mitigated by means of polarization scrambling, the polarization scrambling is carried out faster so that error correction processing can be carried out efficiently. Also, reduction in jitter tolerance, caused by the increase in the speed of the polarization scrambling, is effectively controlled. That is, as indicated by the broken line of FIG. 4, the penalty can be effectively reduced even when the polarization scrambling is thus made faster. Thereby, it is possible to provide the configuration in which influence of the polarization mode dispersion in the optical fiber can be effectively mitigated.

BRIEF DESCRIPTION OF THE DRAWINGS

Other objects and further features of the present invention will become more apparent from the following detailed description when read in conjunction with the accompanying drawings.

DETAILED DESCRIPTION OF THE PREFERRED EMBODIMENTS

Figure 9:
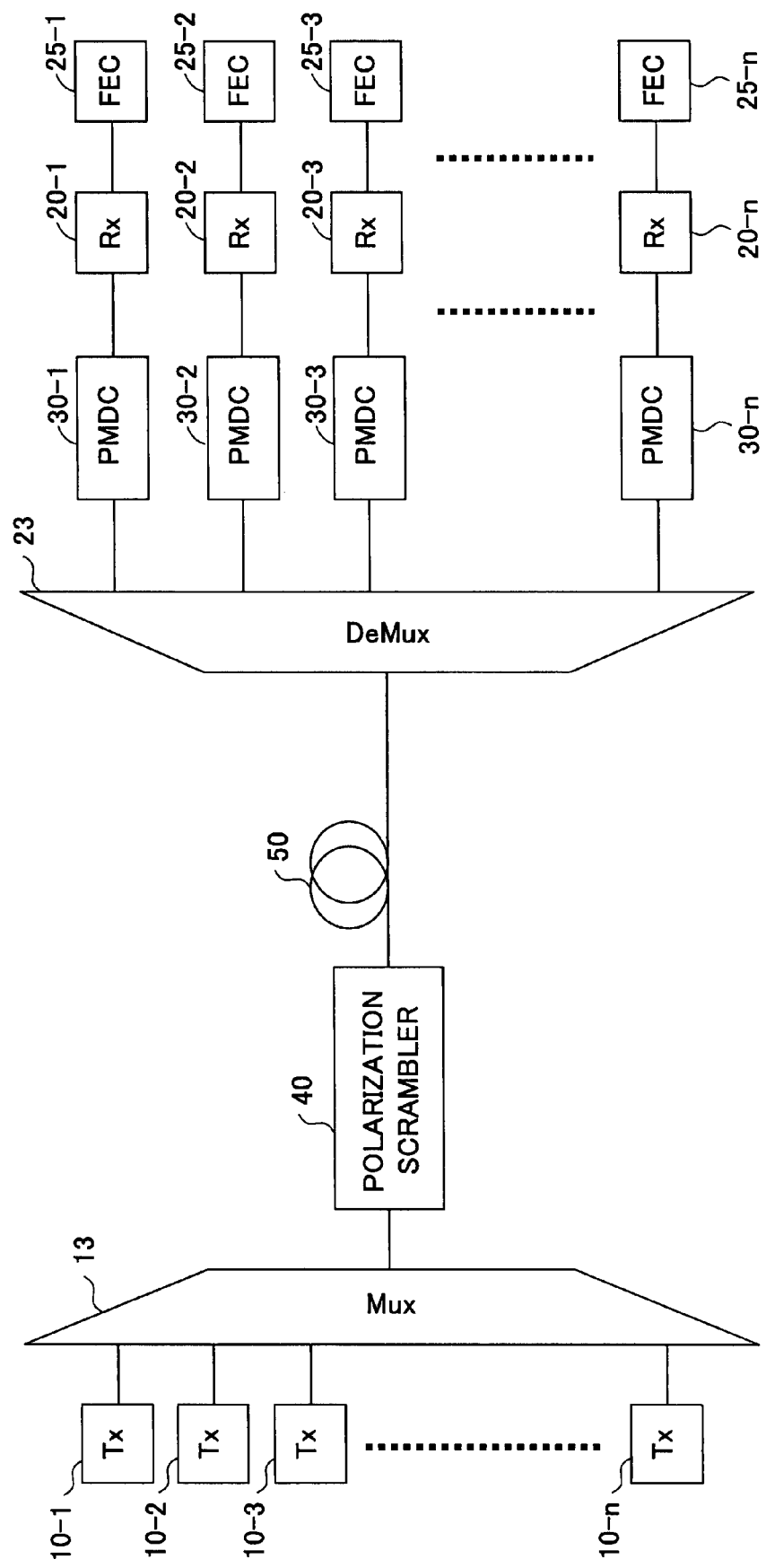
FIG. 9 shows a block diagram of a first embodiment of the present invention.

FIG. 9 shows a block diagram of an optical signal transmission system in one embodiment of the present invention.

As shown in FIG. 9, this system has transmission units 10-1, 10-2, . . . , 10-n, a wavelength division multiplexer/demultiplexer 13 and a polarization scrambler 40 provided in a transmission station, an optical fiber 50 connecting between the transmission station and a reception station, a wavelength division multiplexer/demultiplexer 23, optical polarization mode dispersion compensation units 30-1, 30-2, 30-n, reception units 20-1, 20-2, . . . , 20-n and forward error correction units 25-1, 25-2, . . . , 25-n, provided in the reception station.

The transmission units 10-1, 10-2, 10-n in the transmission station have functions of modulating laser light of respective n wavelengths with respective transmission signals previously designated to the corresponding respective wavelengths. Thanks to the functions of the transmission units 10-1, 10-2, . . . , 10-n, optical signals of the predetermined n wavelengths, corresponding to the transmission signals previously designated to the corresponding respective wavelengths, are generated.

The thus-generated optical signals of the n wavelengths are multiplexed by means of the wavelength division multiplexer/demultiplexer 13. The thus-obtained wavelength multiplexed signal then undergoes polarization scrambling in the polarization scrambler 40, and after that, is transmitted to the reception station through the optical fiber 50.

Figure 5:
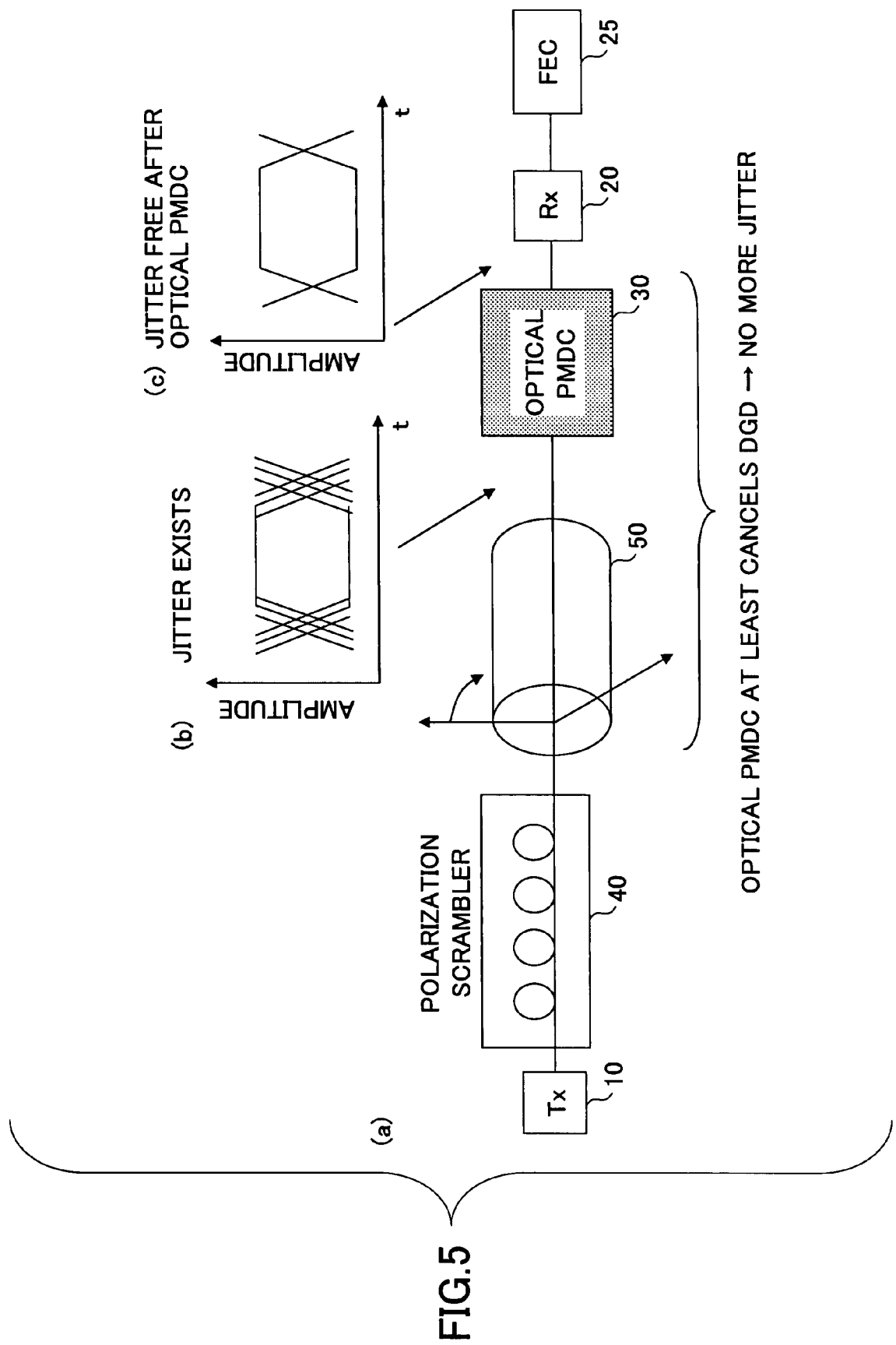
FIG. 5 shows a block diagram of an embodiment of the present invention.
Figure 6:
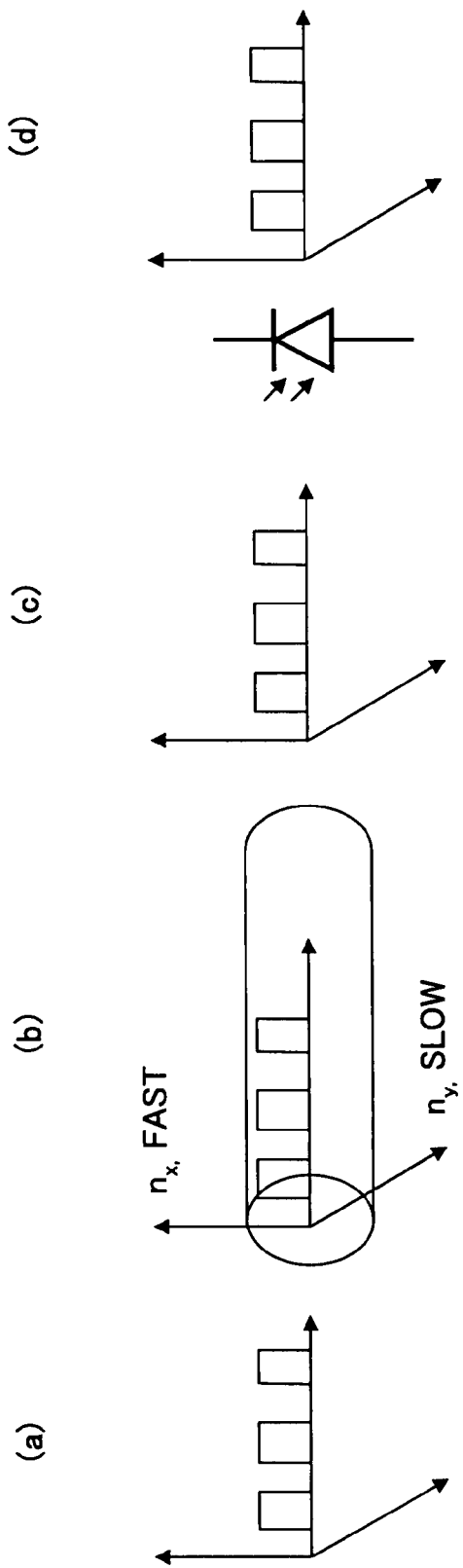
FIGS. 6 and 7 illustrate a first-order polarization mode depression.
Figure 7:
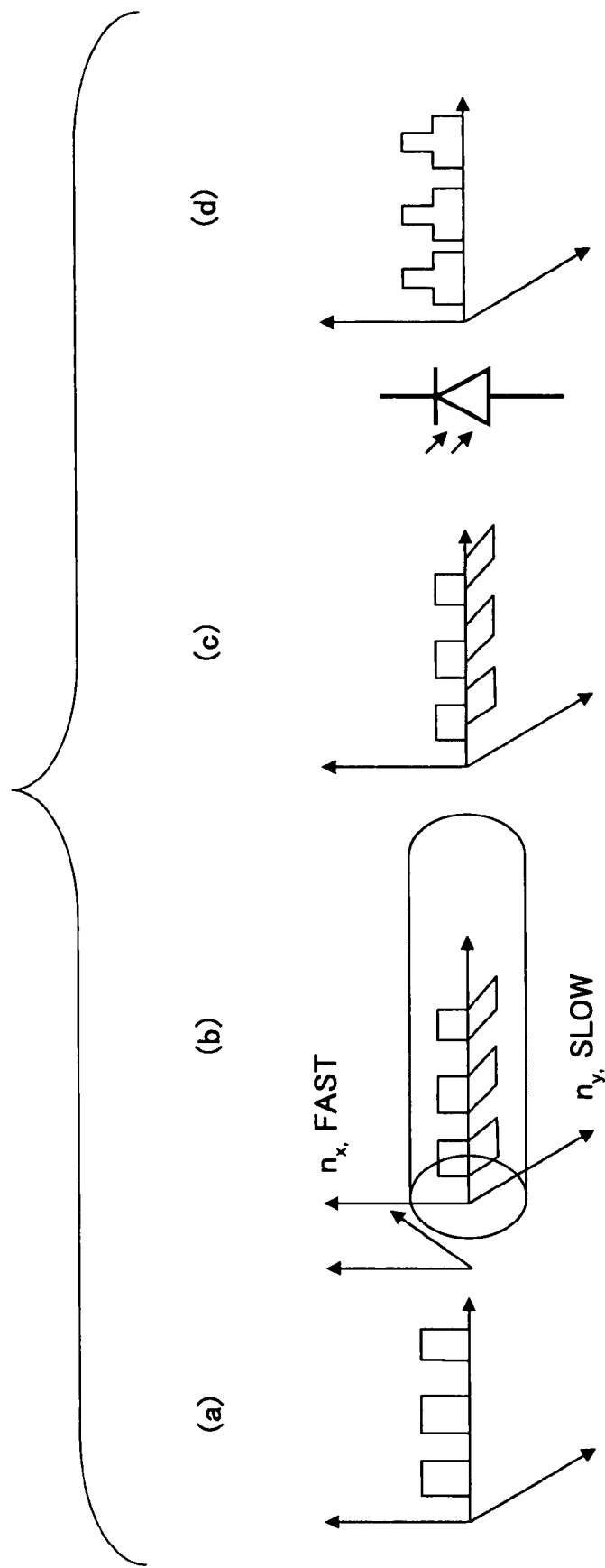
Figure 8:
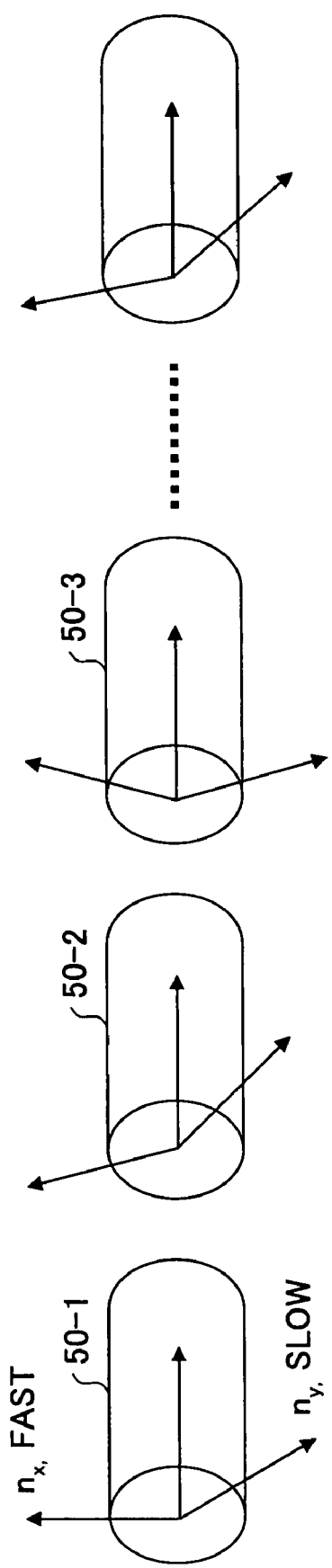
FIG. 8 illustrates a high-order polarization mode depression.

The optical signal thus transmitted by the optical fiber 50 is demultiplexed in the respective wavelengths by means of the wavelength multiplexer/demultiplexer 23 in the reception station. The thus-obtained optical signals of the respective wavelengths then undergo polarization mode dispersion compensation processing for the respective wavelengths by the respective corresponding optical polarization mode dispersion compensation units 30-1, 30-2, ..., 30-n. As a result, as shown in FIGS. 5 (b) and (c), differential group delay included in the optical signals for the respective wavelengths is suppressed. Thereby, as described later, a jitter amplitude, influence of which on jitter tolerance increases due to necessary increase in the speed of the polarization scrambling is effectively suppressed.

The optical signals of the respective wavelengths, the differential group delay of which is thus suppressed, are then converted into corresponding electric signals, which are then converted into corresponding digital signals through a clock recovery function in the reception units 20-1, 20-2, ..., 20-n provided for the respective corresponding wavelengths. Thus, respective ones of transmitted information, previously designated to the respective wavelengths, are extracted or reproduced.

On the thus-obtained digital signals corresponding to the optical signals of the respective wavelengths, forward error correction processing is carried out by means of the forward error correction units 25-1, 25-2, ..., 25-n. As a result, errors, if any, included in the digital signals, are corrected, and thus, the respective ones of the transmitted information previously designated to the respective wavelengths are obtained in a state in which the errors, if any, are thus corrected.

Figure 2:
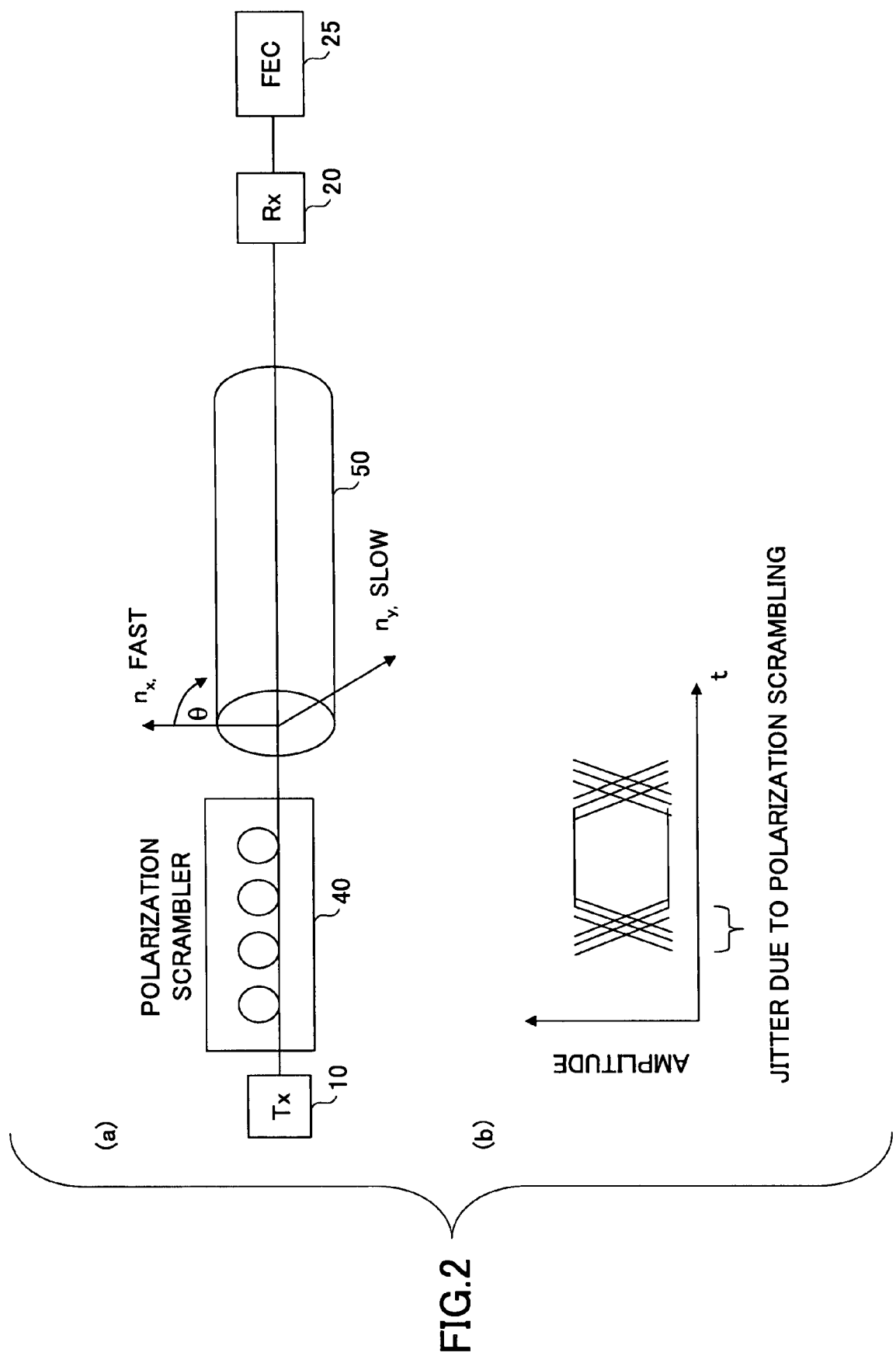
Figure 3:
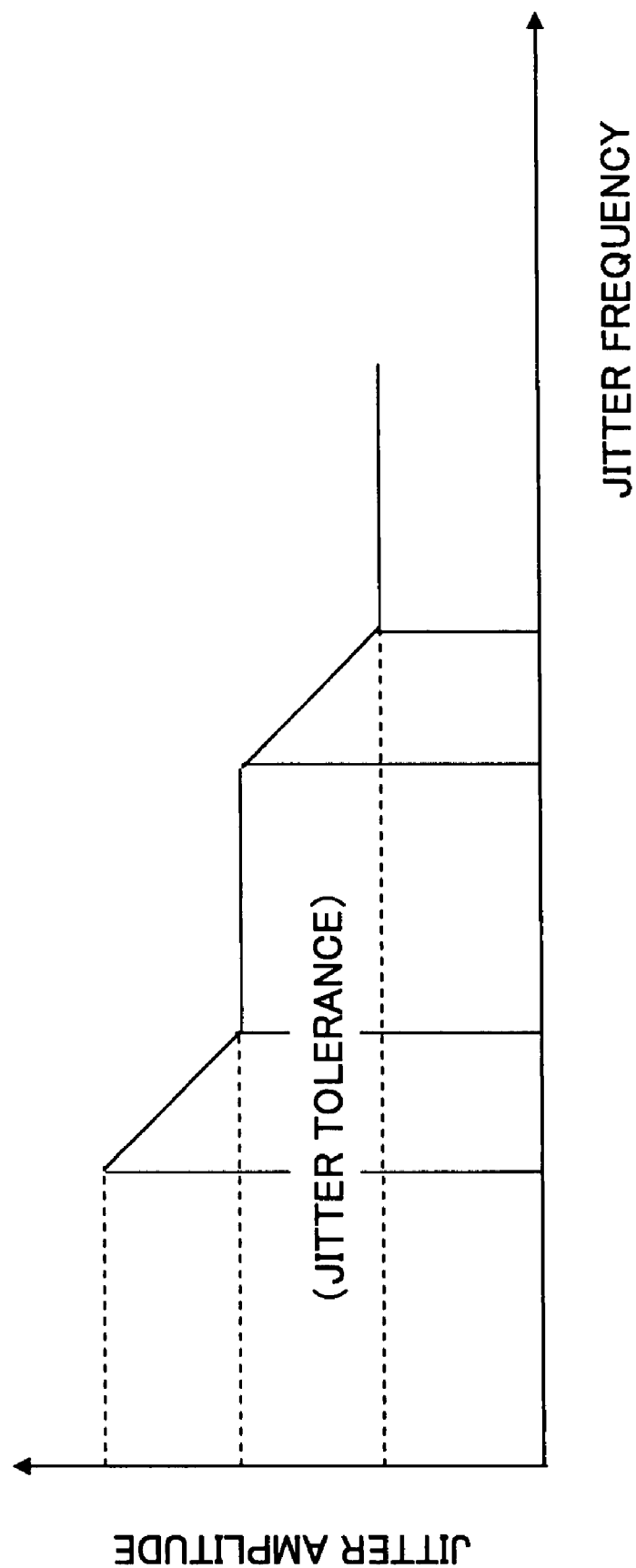
Figure 4:
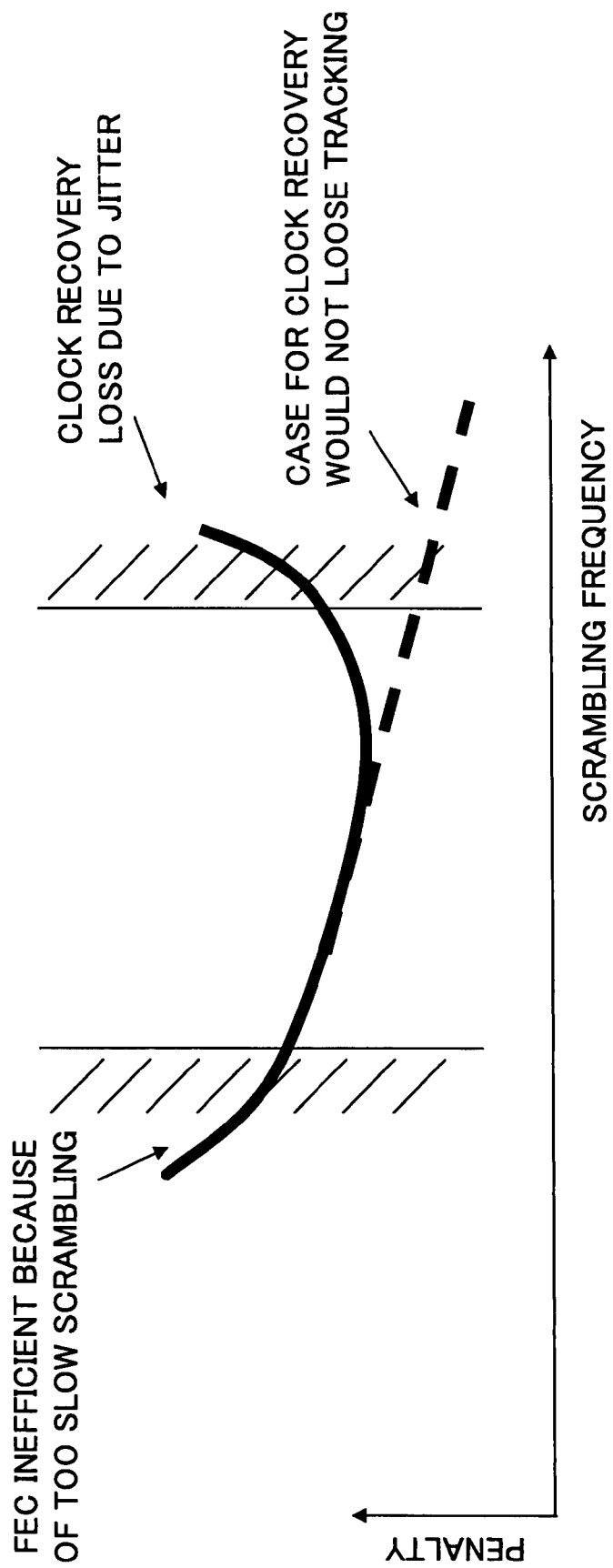

It is noted that, as the above-mentioned transmission units 10-1, 10-2, ..., 10-n, wavelength division multiplexer/demultiplexers 13, polarization scrambler 40, wavelength multiplexer/demultiplexer 23, reception units 20-1, 20-2, ..., 20-n and forward error correction units 25-1, 25-2, ..., 25-n, those of well-known configurations can be applied. It is noted that, as a document disclosing a system using a polarization scrambler and forward error correction, for example, the patent document 4, mentioned above, exists. In particular, in a configuration of FIG. 2 of this document, a FPS 208 and a FEC decoder 230 correspond to the above-mentioned polarization scrambler 40 and forward error correction units 25-1, 25-2, ..., 25-n, respectively.

The above-mentioned polarization scrambler 40 has such a function of carrying out polarization scrambling so fast that all the polarization states appear within a FEC frame period of the forward error correction processing carried out by the forward error correction units 25-1, 25-2, ..., 25-n of the reception station. As a result of this function, the forward error correction processing can be efficiently carried out in the forward error correction units 25-1, 25-2, ..., 25-n of the reception station. Thus, the error correction can be positively carried out.

That is, in the forward error correction, each FEC frame is regarded as a unit of error correction. On the other hand, the polarization states of the optical signals change due to the polarization scrambling, where the polarization states change randomly with a fixed period. When this polarization state changing period is longer than the FEC frame period, errors in the polarization states changing period, if any, may appear through a plurality of FEC frames. Thereby, the forward error correction processing may not properly detect the errors to correct the same.

Figure 1:
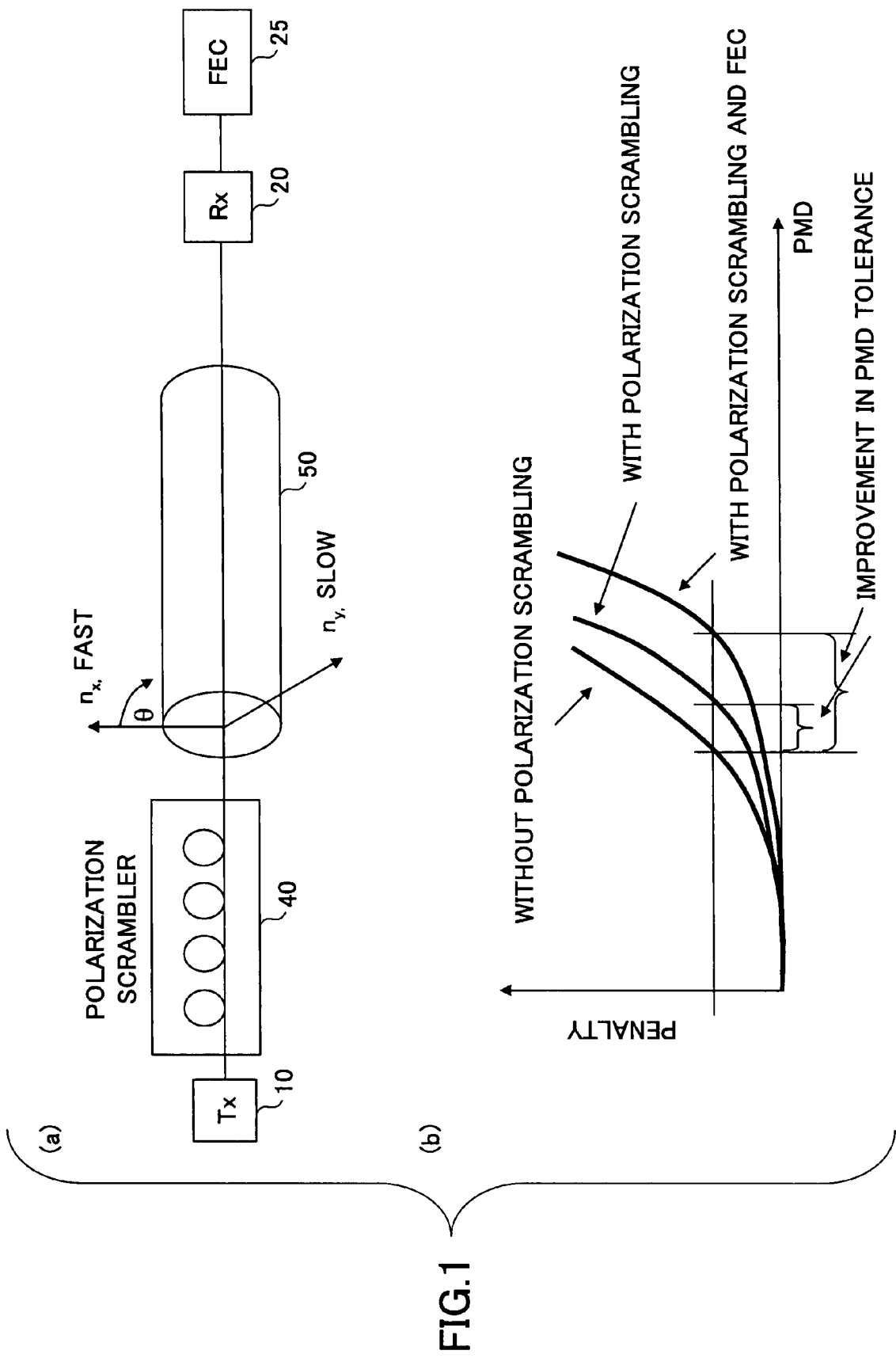
FIGS. 1 through 4 illustrate problems in a prior art.
Figure 10:
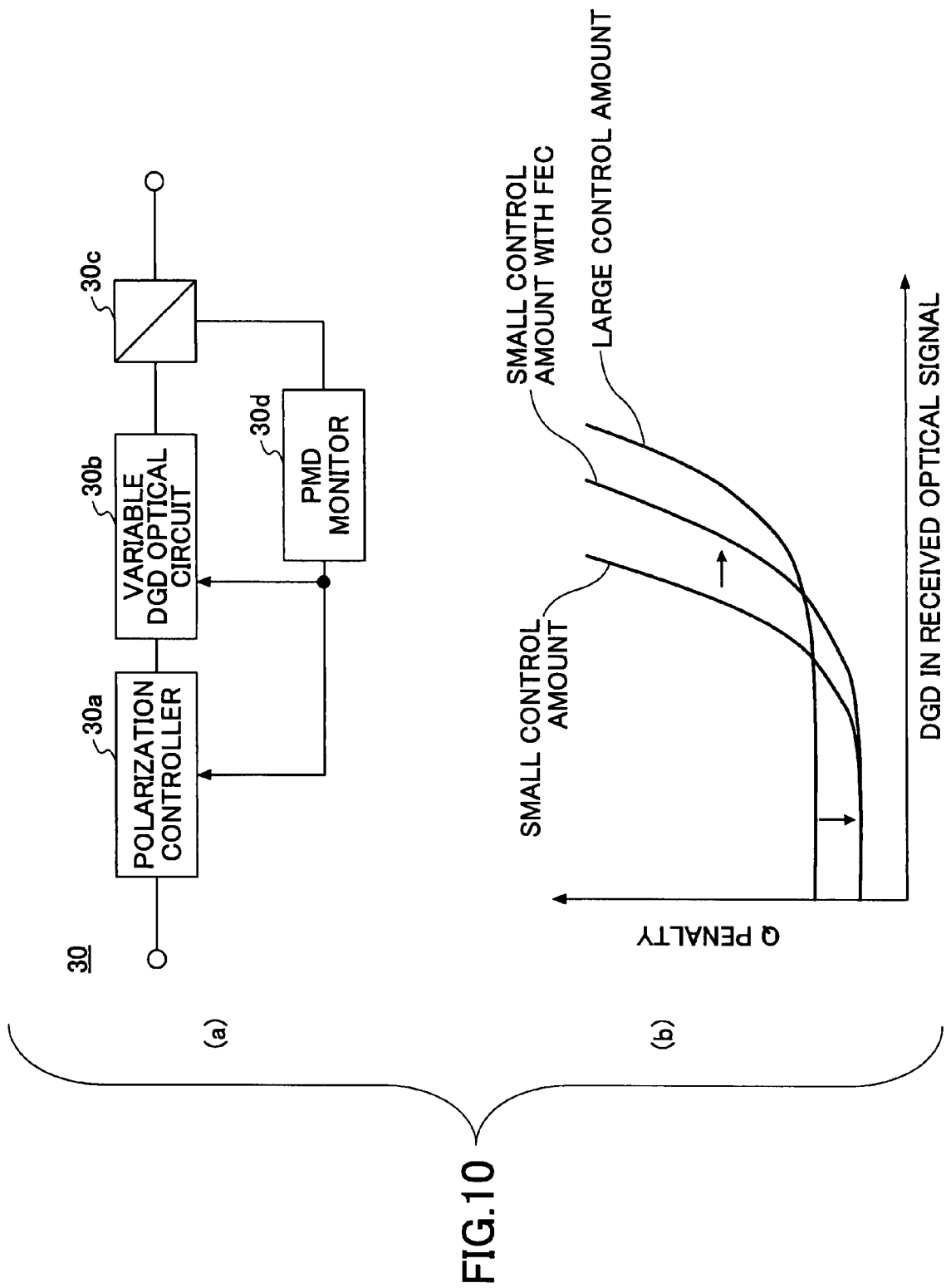
FIG. 10 illustrates an optical PMDC.

FIG. 10 (a) shows a block diagram illustrating an example of a configuration of each of the optical polarization mode dispersion compensation units 30-1, 30-2, ..., 30-n provided for the respective wavelengths. This configuration corresponds to an 'optical stage compensating system' described in FIG. 1 (a) and a relevant passage of the above-mentioned non-patent document 7.

As shown in FIG. 10 (a), each of the respective optical polarization mode dispersion compensation units 30-1, 30-2, ..., 30-n includes a polarization controller 30a, a variable DGD optical circuit 30b, a light detector 30c and a PMD monitor 30d. The polarization controller 30a carries out optical waveform shaping processing by adjusting polarization states in front of the variable DGD optical circuit 30b, also in front of the corresponding one of the reception units 20-1, 20-2, ..., 20-n. Thus, polarization mode dispersion processing is carried out in such a manner that influence of the polarization mode dispersion occurring in the optical fiber should be positively cancelled out. As a result, differential group delay included in the received optical signals can be effectively suppressed. Thus, a jitter amplitude, influence of which on jitter tolerance increases due to necessary increase in the speed of the polarization scrambling can be effectively suppressed.

As a result, the jitter amplitudes in the received optical signals, for which jitter frequencies are increased due to the necessary fast polarization scrambling carried out by the polarization scrambler 40 is reduced, and thus, influence thereof can be effectively controlled.

Thus, the jitter tolerance of the reception units 20-1, 20-2, ..., 20-n for the received optical signals improves, clock recovery processing can be positively carried out in the reception units 20-1, 20-2, ..., 20-n, and thereby, the digital signals corresponding to the received optical signals can be obtained with high precision.

On the thus-obtained digital signals, forward error correction processing is carried out by the forward error correction units 25-1, 25-2, ..., 25-n. Thereby, even when signal distortion is left uncompensated in the polarization mode dispersion compensation processing carried out by the polarization mode dispersion compensation units 30-1, 30-2, ..., 30-n, signal errors due to the signal distortion can be positively corrected. As a result, it is possible to reproduce the transmitted information with further high precision.

As mentioned above, the polarization states of the received optical signal change randomly at a high speed by means of the polarization scrambling. In order to follow them, it is preferable that, not only the polarization controllers 30a, but also the entire automatic feedback control systems of the optical polarization mode dispersion compensation units 30-1, 30-2, ..., 30-n including the PMD monitors 30a have high-speed response capability.

Figure 11:
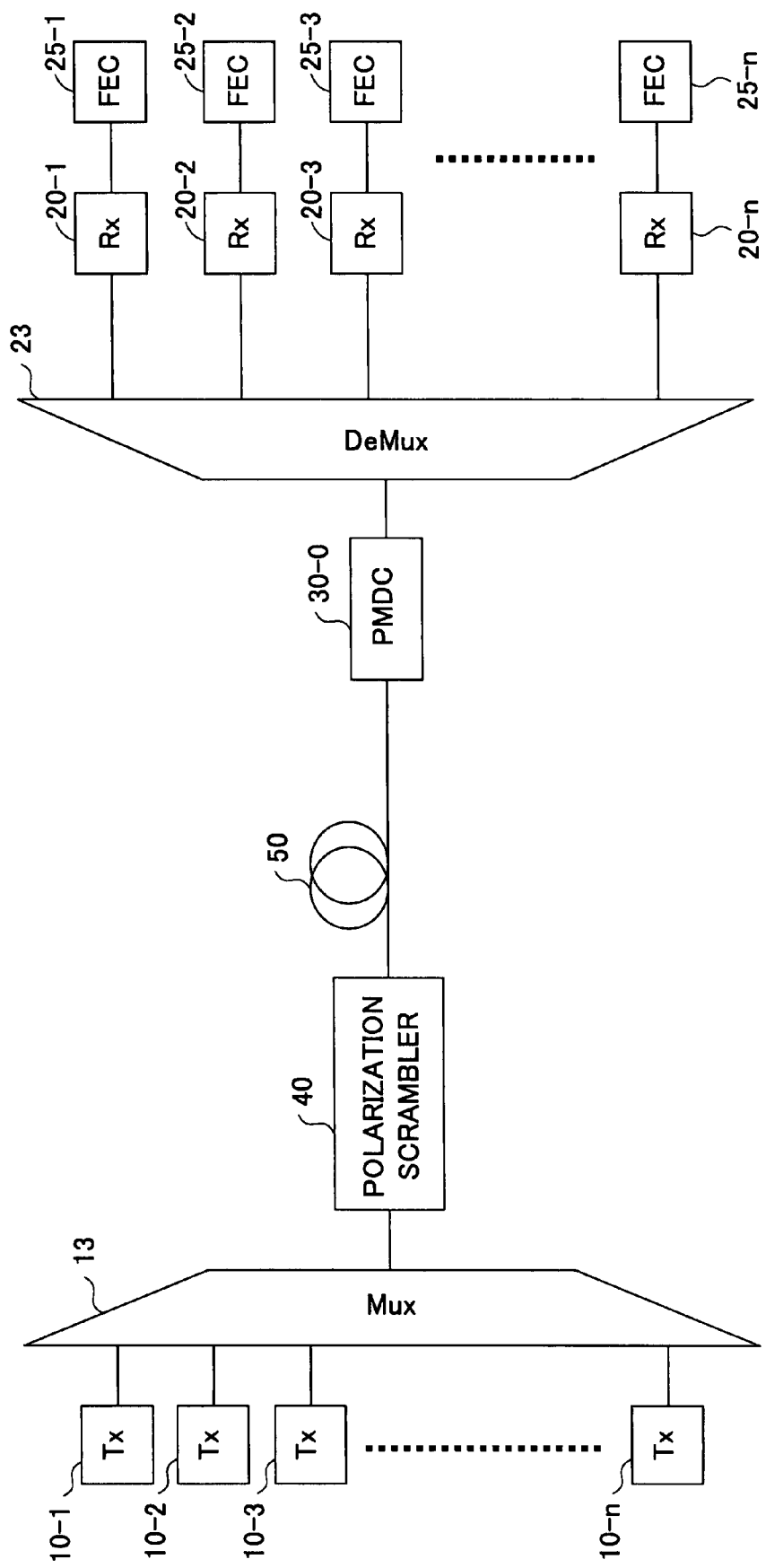
FIG. 11 shows a block diagram of a second embodiment of the present invention.

FIG. 11 shows a block diagram illustrating an optical signal transmission system in a second embodiment of the present invention.

The optical signal transmission system of FIG. 11 has a configuration the same as that of FIG. 9 described above, except a configuration and a position of an optical polarization mode dispersion compensation unit 30-0 provided in a reception station. Therefore, the same reference numerals are given to the corresponding components, and duplicate description to that of the first embodiment described above with reference to FIG. 9, will be omitted.

As shown in FIG. 11, the optical signal transmission system in the second embodiment has transmission units 10-1, 10-2, ..., 10-n, a wavelength division multiplexer/demultiplexer 13 and a polarization scrambler 40 provided in a transmission station, an optical fiber 50 connecting between the transmission station and the reception station, the optical polarization mode dispersion compensation unit 30-0, a wavelength division multiplexer/demultiplexer 23, reception units 20-1, 20-2, ..., 20-n and forward error correction units 25-1, 25-2, ..., 25-n provided in the reception station.

In the reception station of the optical signal transmission system in the second embodiment, an optical signal transmitted by the optical fiber 50 undergoes optical polarization mode dispersion compensation processing by the optical polarization mode dispersion compensation unit 30-0 in a state in which the optical signal has not yet been demultiplexed in respective wavelengths by the wavelength division multiplexer/demultiplexer 23, i.e., all the wavelengths are still multiplexed.

A configuration of the optical polarization mode dispersion compensation unit 30-0 is the same as each of those of the optical polarization mode dispersion compensation units 30-1, 30-2, ..., 30-n described above with reference to FIG. 10 (a). However, as will be described later, since it is necessary to carry out optical polarization mode dispersion compensation processing for each wavelength, multiplexed in the given optical signal, a corresponding configuration is further required.

Specifically, a branching filter or such for causing the given optical signal to branch into the respective multiplexed wavelengths may be provided, and further, a multiplexer for returning the thus-branched signals into the original multiplexed state, may also be provided. Alternatively, such a method may be applied that optical polarization mode dispersion compensation processing is carried out on a given optical signal in a multiplexed state, which method has been proposed.

It is noted that, in FIG. 9, the wavelength division multiplexer/demultiplexer 23, the optical polarization mode dispersion compensation units 30-1, 30-2, ..., 30-n, the reception units 20-1, 20-2; ..., 20-n and the forward error correction units 25-1, 25-2, ..., 25-n correspond to an optical signal processing apparatus. Similarly, in FIG. 11, the optical polarization mode dispersion compensation unit 30-0, the wavelength division multiplexer/demultiplexer 23, the reception units 20-1, 20-2, ..., 20-n and the forward error correction units 25-1, 25-2, ..., 25-n correspond to an optical signal processing apparatus.

When optical polarization mode dispersion compensation processing is thus carried out in combination with the polarization scrambling which operates necessarily at a high speed for the purpose of efficient forward error correction as mentioned above, a response speed of the polarization mode dispersion compensation is important. In order that error correction in the forward error correction is carried out efficiently, it is necessary that a rate of changing of a polarization mode in the polarization scrambler 40, i.e., a change frequency (i.e., a scrambling frequency) should be not less than hundreds of kilohertz. The polarization mode dispersion compensation should then follow this rate of the polarization state changing. Therefore, the optical polarization mode dispersion compensation unit should have a response speed of not less than hundreds of kilohertz. Especially, in the above-described optical signal transmission system of FIG. 9 or FIG. 11, since there may be no correlation between the wavelengths to multiplex, the PMD monitor 30d shown in FIG. 10 (a) should monitor polarization mode dispersion of optical signals for each of the wavelengths multiplexed there.

In the case of FIG. 11 in which the received wavelength multiplexed signal as it is undergoes the polarization mode dispersion compensation in a lump, a response speed of the PMD monitor 30d is important. That is, for example, such a method may be applied that a single PMD monitor 30d is used, and a wavelength to be measured by the PMD monitor 30d is switched in sequence among the respective wavelengths. In this case, the wavelength to be measured should be switched at a high speed accordingly. Alternatively, PMD monitors are provided separately for the respective wavelengths.

It is noted that technology disclosed by the above-mentioned patent documents 1 through 3 may be applied to the above-mentioned optical polarization mode dispersion compensation units 30-0, 30-1, 30-2, ..., 30-n.

Thus, in the embodiments of the present invention, polarization scrambling is carried out at high speed so that all the polarization states appear within a FEC frame period in forward error correction processing. As a result, it is possible that the forward error correction processing operates efficiently. Further. The optical polarization mode dispersion compensation unit(s) is(are) provided, and thus, a jitter amplitude, influence of which on jitter tolerance increases due to the above-mentioned necessary high-speed polarization scrambling, can be effectively reduced. Thereby, signal capture by means of clock recovery on the reception side can be carried out positively. Thereby, upon reproduction of transmitted information, a possibility of occurrence of error included in the reproduced information can be effectively reduced, and thus, reproduction precision can be further improved.

FIG. 10 (b) illustrates these functions of the reception-side optical signal processing apparatus described above with reference to FIGS. 10 (a) and 11. FIG. 10 (b) shows relationship between differential group delay (DGD) included in the received optical signal and a Q penalty in the reception-side signal reproduction, with respect to a feedback control amount in the optical polarization mode dispersion compensation units (optical PMDC) 30-1, 30-2, ..., 30-n or the optical polarization mode dispersion compensation unit 30-0, with/without forward error correction (FEC). The Q penalty means a value indicating a degree of disadvantage in reception-side signal reproduction. That is, when this value is large, satisfactory signal reproduction performance cannot be obtained on the reception side.

As shown in FIG. 10 (b), when the control amount in the optical polarization mode dispersion compensation units (optical PMDC) 30-1, 30-2, ..., 30-n or the optical polarization mode dispersion compensation unit 30-0 is small (corresponding to a curve of SMALL CONTROL AMOUNT), the Q penalty is small and thus, reproduction performance is satisfactory while differential group delay included in the received optical signal is small (left hand of FIG. 10 (b)). However, when differential group delay included in the received optical signal increases (right hand of FIG. 10 (b)), the Q penalty increases, and thus, the reproduction performance degrades. On the other hand, when the control amount in the optical polarization mode dispersion compensation units (optical PMDC) 30-1, 30-2, ..., 30-n or the optical polarization mode dispersion compensation unit 30-0 is increased (corresponding to a curve of LARGE CONTROL AMOUNT), a Q penalty is large and thus reproduction performance is not satisfactory while differential group delay included in the received optical signal is small. However, even when differential group delay included in the received optical signal increases, increase in the Q penalty can be controlled, and thus, a rate of degradation in the reproduction performance can be reduced in comparison to the case of SMALL CONTROL AMOUNT.

In contrast thereto, according to the embodiments of the present invention, as described above with reference to FIGS. 9, 10 (a) and 11, the optical polarization mode dispersion compensation units (optical PMDC) 30-1, 30-2, ..., 30-n or the optical polarization mode dispersion compensation unit 30-0 controls differential group delay included in the received optical signal, and also, the forward error correction units 25-1, 25-2, . . . , 25-n are provided, whereby forward error correction (FEC) processing is carried out. As a result, as indicated by a curve of SMALL CONTROL AMOUNT WITH FEC in FIG. 10 (b), when the feedback control amount(s) in the optical polarization mode dispersion compensation unit(s) is(are) reduced, it is possible to ensure reproduction performance as in the case of SMALL CONTROL AMOUNT described above while differential group delay included in the received optical signal is small (left hand of FIG. 10 (b)). Also, it is possible to reduce a rate of degradation in the reproduction performance in comparison to the case of SMALL CONTROL AMOUNT when differential group delay included in the received optical signal increases (right hand of FIG. 10 (b)). As a result, it is possible to stably maintain differential group delay tolerance at a high level without regard to an amount of differential group delay included in the received optical signal. Thus, it is possible to provide satisfactory signal reproduction performance in the embodiments of the present invention.

While the invention herein disclosed has been described by means of specific embodiments and applications thereof, numerous modifications and variations could be made thereto by those skilled in the art without departing from the scope of the invention set forth in the claims.

The present application is based on Japanese Priority Application No. 2006-299011, filed on Nov. 2, 2006, the entire contents of which are hereby incorporated herein by reference.

What is claimed is:

1. An optical signal transmission system comprising:
a polarization scrambler that carries out polarization scrambling on an optical signal to cause all the polarization states in the optical signal appear within a FEC frame period of forward error correcting processing carried out by an error correction part of an optical signal processing apparatus;
an optical fiber that transmits the optical signal; and
the optical signal processing apparatus including,
a polarization mode dispersion compensating part that receives the optical signal and optically suppresses differential group delay contained in the optical signal;
a signal converting part that converts the optical signal in which differential group delay has been suppressed by means of the polarization mode dispersion compensating part, into an electric signal; and
the error correcting part configured to carry out the forward error correcting processing on the electric signal obtained from the signal converting part, wherein:
the polarization mode dispersion compensating part suppresses a jitter amplitude contained in the optical signal, influence of which on jitter tolerance increases due to the increase in a speed of the polarization scrambling.

2. The optical signal transmission system as claimed in claim 1, wherein:
the error correcting part of the optical signal processing apparatus carries out the forward error correcting processing efficiently when a polarization state which changes at a high speed due to the increase in the speed of the polarization scrambling appears within the FEC frame period.

3. The optical signal transmission system as claimed in claim 1, wherein:
the polarization mode dispersion compensating part of the optical signal processing apparatus is configured so that jitter occurring due to the increase in the speed of the polarization scrambling of the polarization scrambler is suppressed, and thus, extraction of transmitted information from the electrical signal by means of clock recovery processing is carried out properly.

4. The optical signal transmission system as claimed in claim 1, wherein:
the optical signal includes a wavelength multiplexed signal,
the optical signal processing apparatus has a wavelength demultiplexing part that demultiplexes the optical signal in respective wavelengths,
the polarization mode dispersion compensating part of the optical signal processing apparatus is provided for each wavelength obtained from demultiplexing in the respective wavelengths by the wavelength demultiplexing part, and includes:
a monitoring part that monitors the differential group delay for each wavelength; and
a compensating part that cancels out the differential group delay of the optical signal according to the differential group delay detected by the monitoring part.

5. The optical signal transmission system as claimed in claim 1, wherein:
the optical signal is a wavelength multiplexed signal,
the optical signal processing apparatus has a wavelength demultiplexing part that demultiplexes the optical signal in respective wavelengths,
the polarization mode dispersion compensating part of the optical signal processing apparatus is provided in a stage in front of a stage in which the optical signal is demultiplexed in the respective wavelengths, and includes:
a monitoring part that monitors the differential group delay for each wavelength included in the optical signal; and
a compensating part that cancels out the differential group delay of the optical signal according to the differential group delay thus detected by the monitoring part.

6. An optical signal transmission method, comprising:
carrying out polarization scrambling on an optical signal to cause all the polarization states in the optical signal appear within a FEC frame period of forward error correcting processing;
transmitting the optical signal;
optically suppressing differential group delay contained in the optical signal transmitted in the transmitting;
converting the optical signal in which the differential group delay is suppressed in the optically suppressing, into an electric signal; and
carrying out the forward error correcting processing on the electric signal obtained in the converting, wherein:
in the optically suppressing, a jitter amplitude in the optical signal is suppressed, influence of which on jitter tolerance increases due to the increase in a speed of the polarization scrambling.

7. The optical signal transmission method as claimed in claim 6, wherein:
in the carrying out the forward error correcting processing, the forward error correcting processing is carried out efficiently when a polarization state which changes at a high speed due to the increase in the speed of the polarization scrambling appears within the FEC frame period.

8. The optical signal transmission method as claimed in claim 6, wherein;
in the optically suppressing, jitter occurring due to the increase in the speed of the polarization scrambling is suppressed, and thus, extraction of transmitted information from the electrical signal by means of clock recovery processing is carried out properly.

9. The optical signal transmission method as claimed in claim 6, wherein:

the optical signal is a wavelength multiplexed signal, and demultiplexing the optical signal in respective wavelengths is carried out after the transmitting;

the optically suppressing includes:

monitoring the differential group delay for each wavelength obtained from demultiplexing in the respective wavelengths in the demultiplexing; and cancelling out the differential group delay of the received optical signal, according to the differential group delay detected in the monitoring.

10. The optical signal transmission method as claimed in claim 6, wherein:

the optical signal is a wavelength multiplexed signal, and of demultiplexing the optical signal in respective wavelengths is carried out after the transmitting;

the optically suppressing includes:

in a stage in front of a stage of the demultiplexing, monitoring the differential group delay for each wavelength included in the optical signal; and cancelling out the differential group delay of the received optical signal, according to the differential group delay thus detected in the monitoring.

* * * * *